June 4, 1963
T. A. REITER
3,092,560
NUCLEAR REACTOR LOOP FOR PARTICULATE
RADIATION OUTSIDE CORE
Filed Dec. 30, 1958
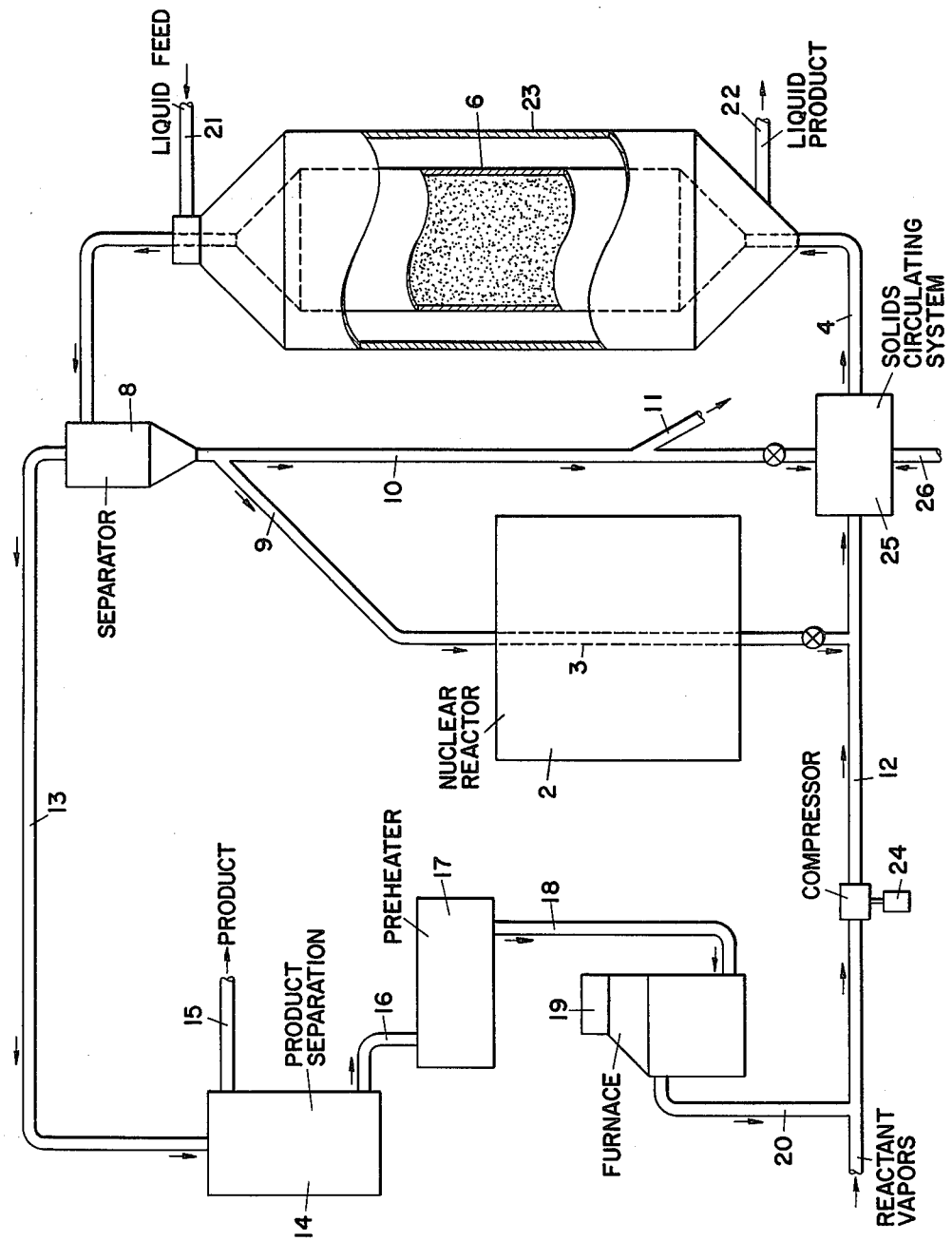
Thomas A. Reiter  Inventor
By Small, Thomas, Duncham & Marx
C. M. Thomas— Attorney

United States Patent Office 3,092,560
Patented June 4, 1963

3,092,560
NUCLEAR REACTOR LOOP FOR PARTICULATE RADIATION OUTSIDE CORE
Thomas A. Reiter, Chatham, N.J., assignor to Esso Research and Engineering Company, a corporation of Delaware
Filed Dec. 30, 1958, Ser. No. 783,764
5 Claims. (Cl. 204—154)

This invention relates to vapor and liquid phase irradiations of chemical reactants, and more particularly to a system for obtaining gamma and beta radiation free of neutrons, wherein a fluidized solid material is subjected to neutron activation and employed in the treatment, production or conversion of vaporizable chemical reactants, especailly hydrocarbons. It is particularly applicable to a system wherein finely divided solid material of high neutron absorption cross-section is continuously recycled between a hydrocarbon reaction zone and a separate reactivation zone comprising a primary source of neutrons.

The necessity of irradiating some chemical systems outside a reactor core is based upon the fact that one or more of the reactants may have a high neutron capture cross-section which upon exposure to neutrons would lead to excessive induced radio-activity in the products. As a result, systems have been proposed for obtaining neutron-free radiation from reactors. For example, it has been previously known that gamma radiation, free of neutrons, can be obtained from a nuclear reactor by circulating through a closed loop an aqueous solution of an element such as indium or manganese, which has a high neutron absorption cross-section and a relatively short half life after activation. Part of the loop passes through a nuclear reactor where the elements are converted to a radioactive state and part passes through an outside radiation utilization zone in which gamma radiation is made available for the initiation of chemical processes, for sterilizing foods, or for other useful processes. Solutions employed for this purpose have consisted of aqueous solutions of soluble salts, such as indium sulfate. Such operations, however, have been handicapped by severe problems with respect to corrosion and stability of the solutions which were employed. Further, structural requirements have necessitated constructing such a loop of materials which stop passage of all but the most penetrating gamma radiation. The present invention obviates these and other difficulties of the prior art by providing radioactive elements in the form of fluidized solids within a closed loop-type facility. These solids can be circulated either as finely divided metal, alloys, minerals, or oxides, carbides or other salts, stable at the temperatures encountered in an operating neutronic reactor, usually below 1200° F.

Briefly, the present invention provides high energy ionizing radiation, free of neutrons, by the circulation of a finely divided solid material of high neutron absorption cross-section through a closed loop, a limited portion of which passes through a neutron activation zone, which can comprise a neutronic reactor or other source of fission-inducing radiation, in which the solid material is converted into a radioactive form, and a limited portion of which passes through an external irradiation zone for chemical processing in which zone the fluidized solid is in direct contact with vapors of the chemical reactant to be irradiated. Broadly, any vaporizable chemical reactant can be treated. Particularly, suitable neutron sources have a flux in the range of $10^8$ to $10^{15}$ neutrons per square centimeter per second.

By means of the present discovery stability and corrosion problems are avoided by circulating the radioactive elements in the form of a fluidized solid. The radioactive mass of solid material of particles of fluidizable size is continuously recycled in a fluidized phase between a reaction zone and a separate regeneration or reactivation zone within a nuclear reactor wherein said solid material is made radioactive by neutron bombardment. In the reaction zone the radioactive fluidized solid is in direct contact with fluidizing vapors of the chemical reactant to be irradiated.

As will hereinafter appear, the invention makes possible a radiation source using the energy from a nuclear reactor, of unusual flexibility and of great utility in the field of chemical irradiation processing. Yields, as a percentage of reactor power, are increased markedly by this invention since both the particulate radiation and the gamma radiation can be utilized.

Vapor irradiations within neutronic reactors heretofore have been difficult due to the low energy absorption rate per unit volume of reactant. The low stopping power of chemical reactants in the vapor phase subjected to the primary ionizing radiation, gamma and fast neutrons, has tended to make vapor phase irradiations economically unattractive in spite of the well-known benefits of operating in a non-condensed phase with some chemical reaction systems. Practical irradiation zones are made possible with this invention because the particulate radiation can directly contact the reactants and be readily absorbed, and because this particulate radiation is more readily absorbed than electromagnetic or neutronic radiation.

In the vapor reaction the radioactive solids present in the radiation zone increase reaction efficiency by providing a means for converting any accompanying electromagnetic radiation into usable form. Specifically, the electromagnetic radiation or gamma rays create Compton electrons which, because of the small size of the particles, escape and come into direct contact with the reactant vapors. The circulating solids thus increase the effective density to electromagnetic radiation in the irradiation zone. Thus, the instant invention provides gamma and/or beta irradiation free of neutrons.

An exemplary system for carrying out the invention is diagrammatically disclosed in the drawing attached to and forming a part of this specification. The drawing illustrates an irradiation system comprising a neutron activation zone 2 for inducing radioactivity in a suitable fluidized solid material, which zone can conveniently be a source of neutron radiation such as a neutronic reactor. A suitable neutronic reactor is described by Fermi et al., Patent No. 2,708,656, which issued on May 17, 1955. Within the reactor there is positioned in a region of high neutron flux a standpipe 3 connected to a solids circulating system 25 disposed externally to the reactor. Finely divided solid material in which radioactivity is induced by the absorption of thermal neutrons with high efficiency is circulated from the standpipe through line 4 to an irradiator vessel 6. Alternatively, standpipe 3 can be of the annular type surrounding or blanketing the core to capture the leakage neutrons.

It is to be understood that the handling of finely divided solids in the fluidized state and the solids circulating system for continuously circulating the finely divided fluidized powders between two separate zones forms no part of this invention. The method and the apparatus for handling fluidized solids is strictly conventional and suitable equipment, such as is well known in the art related to the treatment, production, or conversion of hydrocarbons, can be employed. For example, the details of a suitable fluidized solids system wherein a fluidized solid is continuously recycled between two different reaction zones are given in Packie Patent No. 2,589,124, which issued on March 11, 1952, on an application entitled, "Method and Apparatus for Handling Fluidized Solids."

Briefly, the fluidized solid system involves maintaining a dense turbulent fluidized bed of particulate high neutron absorption cross-section solids and passing an upwardly flowing, relatively dilute, stream of the solids through an elongated vertical irradiator vessel 6 extending from within the bed. The solids are picked up by the conveying gas supplied to the solids circulating system 25 by line 12.

According to the present invention, reactant vapors are admitted to the fluidized system and form the fluidizing medium. The irradiator vessel 6 contains a fluidized bed or riser of radioactive material in which the reactant vapors introduced by line 12 undergo irradiation conversion. Such gases and vapors are passed upward through either a fluid bed, maintained in a turbulent, fluidized condition having the appearance of a boiling liquid, or a somewhat lower density cocurrent riser or entrainment zone. The riser zone can consist of one or more passes to obtain sufficient reaction time if needed. Fluidizing gas of the continuously circulating system is collected from cyclone separator 8 and passed together with converted products by line 13 to product separation zone 14. The solids coming from separator 8 can be sent to the standpipe for reactivation via line 9. The remainder of the solids are recycled via line 10. Advantageously, a purge stream can be taken out through line 11 to a suitable vessel not shown for removal of any carbonaceous material deposited on the particles during the chemical reaction. This purified material can be returned to the irradiation system for re-use.

The efficiency of radiation absorption can be further increased by surrounding the vapor phase irradiation zone with a liquid phase reaction zone 23. A liquid reaction feed can be admitted through line 21, absorb gamma escaping from vessel 6, and be drawn off through line 22. Additional fluidizing gas in the form of air, hydrogen, deuterium or helium, and the like, or other reactant vapors can be admitted to the solids circulating zone through line 26 if desirable.

The closed conduit of the circulating system can be constructed of any suitable material mainly having regard for structural strength, for example, steel, iron, or aluminum can be employed.

The product and unreacted vapors are passed by line 13 to a product separation zone 14 wherein the product is removed by line 15. Unreacted material is then passed by line 16 through a preheater 17 and thereafter through line 18 into furnace 19 where it is raised to a temperature suitable for reintroduction into the fluidized system by line 20 and repressurized by compressor 24.

In accordance with the present invention, the finely divided solid material comprises a parent element having a high capture cross-section for thermal neutrons. It can be in metallic form, an oxide or a salt, or other compounds stable at reactor temperatures. Also it can be a compound deposited on other carrier material. Examples of suitable elements for the present invention are copper-63, copper-65, radium-103 and indium-115. Most advantageously a finely divided solid containing in the range of 5 to 100 weight percent of an element having a capture cross-section for thermal neutrons above 1 barn will be employed. Also, as the particular atom must be transported to the irradiator vessel after the neutron has been absorbed in the isotope, half-lives of greater than one second are preferred. Satisfactory fluidization of the mass of finely divided solid material can be obtained with a gas velocity of 0.01 to 20 feet per second where the particles of the mass are in the range of 1 to 1000 microns, it being understood that the above operating variables can be varied by reason of different shape and density of the particles being fluidized. Particle densities can be in the range of 1 to 10 gm./cc. and the solids hold up in the irradiation zone can be from 0.001 to 70 lb./c.f. The material being irradiated can be in the density range of 0.001 to 2 gm./cc.

*Example of Invention*

This example illustrates the invention applied to the manufacture of 100 b./d. of high viscosity index oil by irradiation of cetane vapors at 679° F. and 5 atmospheric pressure. The gas density is about .03 gm./cc. The activatable element used in this example is indium-115 which on neutron capture yields both indium-116 and indium-116$m$. The indium-116 decays by beta emission with an E$p$ of 2.95 mev. with a half life of 13 seconds. The indium-116$m$ decays with a half life of 54 minutes by both beta emission (E$p$ of .6, .87, or 1.0) and gamma emission. The thermal neutron cross-section for the nuclear reaction of indium-115 going to indium-116 is about 52 barns. The thermal neutron cross-section for the nuclear reaction of indium-115 to indium-116$m$ is 145 barns.

In this example 625 b./d. of fresh cetane plus 5,620 barrels of recycle cetane are heated up to 679° F. and injected below the standpipe containing the circulating indium solid. The solids and cetane are passed cocurrently upward in an irradiation zone at a density of about 10 lb./cf. The irradiation zone is about 3′ in diameter and 180′ high, although the vessel height could be reduced and some gain in radiation efficiency made by going to 2 or more passes surrounding the initial pass.

The circulating solids has a particle density of about 115 lb./c.f. and consists of oxides of indium (skeletal density 6–7 gm./cc.) in a porous arrangement. The superficial gas velocity is about 3 feet per second. The weight mean average particle size of the solids is about 75 microns with a particle size distribution of:

| Wt. percent: | Size range, microns |
| --- | --- |
| 13 | 0–44 |
| 34 | 44–74 |
| 28 | 74–104 |
| 17 | 104–147 |
| 4 | 147–175 |
| 4 | 175+ |

In passing through the irradiation zone the reacted hydrocarbon vapors absorp at least 6–7 kw. of radiation. Approximately half of said radiation consists of direct beta radiation from indium-116 and indium-116$m$. These betas escape from the particles and pass through the hydrocarbon. An approximate equal amount of radiation is obtained from the first collision Compton recoil electrons produced by the gamma radiation from indium-116$m$ interacting with the circulating solids in the hydrocarbon vapor.

Solids inventory in the irradiation zone is about 14,000 lbs. and the solids circulation rate is about 250 lb./sec. The solids hold-up time in a nuclear reactor with a neutron flux of $10^{12}$ thermal neutrons/cm.$^2$ sec. is about 5 seconds. The density within the standpipe is about 50 lb./c.f. The solids inventory in the reactor is about 1250 lbs. of indium oxide particles.

The reactor power level is about 17 mw. thermal. The heat from the reactor can be used to generate power or for process heating.

The irradiation zone products are separated from the solids and sent to product recovery where the light products are removed, recycle or unreacted feed is separated, and 100 b./d. of high viscosity index lube stock is sent to final blending.

It is to be understood that the above-described arrangements and techniques are but illustrative of the application of the principles of the invention. Numerous other arrangements may be devised by those skilled in the art without departing from the spirit and scope of the invention.

What is claimed is:

1. An irradiation process comprising activating finely divided fluidizable solids in a neutron activation zone by irradiation thereof with thermal neutrons at flux in the range of $10^8$ to $10^{15}$ thermal neutrons per square centimeter per second, said solids comprising in the range of 5 to 100 weight percent of an element having an absorption cross-section for neutrons above 1 barn and producing an isotope that decays with the emission of neutron-free particulate and gamma radiation, then flowing the solids so activated into a chemical reaction zone separate from said neutron activation zone, maintaining said solids in a fluidized state in said chemical reaction zone by introducing into the base thereof a fluidizing gas consisting essentially of a gasiform chemical reactant, converting at least a portion of said chemical reactant in said reaction zone by neutron-free radiation from said solids, returning solids from said chemical reaction zone to said neutron activation zone, recovering said fluidizing gas from said chemical reaction zone and separating a product therefrom.

2. The method of claim 1 wherein said neutron activation zone is an operating neutronic reactor.

3. The method of claim 1 wherein said element is converted in said neutron activation zone to a radioactive element having a half-life greater than one second.

4. The method of claim 1 wherein said chemical reactant is a hydrocarbon.

5. The process of claim 1 wherein said chemical reaction zone to which is fed a gasiform chemical reactant is surrounded by a liquid phase reaction zone and gamma radiation escaping from said first named zone irradiates said liquid phase reaction zone.

References Cited in the file of this patent

UNITED STATES PATENTS

| | | |
|---|---|---|
| 1,627,938 | Tingley | May 10, 1927 |
| 2,589,124 | Packie | Mar. 11, 1952 |
| 2,781,309 | Levinger et al. | Feb. 12, 1957 |
| 2,845,388 | Black et al. | July 29, 1958 |
| 2,845,414 | Schutze | July 29, 1958 |
| 2,905,610 | Wigner | Sept. 22, 1959 |

OTHER REFERENCES

Nucleonics, vol. 15, July 1957, pages 76–79.